(12) United States Patent
Jamison

(10) Patent No.: US 7,066,780 B2
(45) Date of Patent: Jun. 27, 2006

(54) PET ENTERTAINMENT DEVICE

(76) Inventor: George Randall Jamison, 154 N. Sagehen St., Nampa, ID (US) 83651

( * ) Notice: Subject to any disclaimer, the term of this patent is extended or adjusted under 35 U.S.C. 154(b) by 0 days.

(21) Appl. No.: 10/811,366

(22) Filed: Mar. 25, 2004

(65) Prior Publication Data
US 2005/0211193 A1   Sep. 29, 2005

(51) Int. Cl.
*A63H 33/22* (2006.01)
(52) U.S. Cl. .................... 446/219; 446/27; 119/707
(58) Field of Classification Search ............. 446/219, 446/26, 27, 484, 491; 119/702, 707
See application file for complete search history.

(56) References Cited

U.S. PATENT DOCUMENTS

| | | | |
|---|---|---|---|
| 5,443,036 A | | 8/1995 | Amiss et al. |
| 5,844,377 A | * | 12/1998 | Anderson et al. ........... 315/251 |
| 5,934,223 A | | 8/1999 | Ellery-Guy |
| 6,045,575 A | * | 4/2000 | Rosen et al. ................... 607/88 |
| 6,144,302 A | * | 11/2000 | Cotty et al. ............... 340/573.1 |
| 6,223,987 B1 | | 5/2001 | Knowles et al. |
| 6,505,576 B1 | | 1/2003 | Nathanson et al. |
| 6,557,495 B1 | | 5/2003 | Lorenz |
| 6,651,591 B1 | | 11/2003 | Chelen |
| 6,887,170 B1 | * | 5/2005 | Stauber et al. ............... 473/422 |

FOREIGN PATENT DOCUMENTS

GB    2305848 A  *  4/1997

\* cited by examiner

*Primary Examiner*—Kien Nguyen
(74) *Attorney, Agent, or Firm*—Stephen M. Nipper; Dykas, Shaver & Nipper

(57) ABSTRACT

A pet entertainment device for the entertainment of a pet. The device having a laser device that is configured to attach to a pet though use of a garment, such as a collar. The laser device preferably controllable through use of a remote control so that the movement of the pet (dog, cat, etc.) can be directed by the pet's owner.

18 Claims, 2 Drawing Sheets

PET ENTERTAINMENT DEVICE

BACKGROUND OF THE INVENTION

1. Field of the Invention

The present invention generally relates to toys and games, and more particularly relates to a laser-projecting device for the entertainment of pets and/or their masters.

2. Background Information

Light amplification by stimulated admission of radar ("laser") devices were first invented in the late 1950s or early 1960s. These original lasers being enormous in size, typically the size of a small room. Twenty years or so later, advancements in laser technology resulted in the ability to manufacture small handheld "laser pointers," a type frequently used by lecturer's during presentations. Sometime thereafter, likely immediately thereafter, individuals began using these handheld laser pointing devices for the entertainment of their pets, such as dogs, cats, etc., at home.

Various patents are directed toward devices for the exercise and/or amusement of pets. For instance, U.S. Pat. No. 5,443,036 (Amiss et al.) discloses a method of exercising a cat. The Amiss et al. method is essentially exercising a cat by having the cat chase the laser beam around a workout area, with the laser emitting device held and aimed by the pet's owner.

A second laser pet amusement device is shown in the patent to Lorenz (U.S. Pat. No. 6,557,495), which discloses a laser pet toy for the entertainment of pets, comprised of a housing containing a laser source which projects a laser onto a mirror. This mirror reflects the beam onto an opaque surface wherein random movements are used for the entertainment of the pet.

The Chelen patent (U.S. Pat. No. 6,651,591) discloses an automatic laser toy and exerciser. This device uses nitinol wires, which are used to control the three dimensional movement of the laser.

The Nathanson et al. patent (U.S. Pat. No. 6,505,576) discloses a pet toy, comprising a housing containing a moving laser, which is reflected out of the housing through the use of a mirror.

The Ellery-Guy patent (U.S. Pat. No. 5,934,223) discloses a pet toy comprising a bulb, which is configured to display a moving image onto a surface for the entertainment of a pet.

What is needed is a device for the entertainment of a pet and/or observing humans that utilizes a garment mounted laser device for wearing by the pet, preferably this laser device controllable through the use of a remote control operated by a third person.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

One of the embodiments of the present invention comprises a pet entertainment device for wearing by a pet. The pet having a head end and a tail end. The pet entertainment device comprising a garment and a laser source. The garment configured for wearing by the pet. The laser source for producing a laser beam. The laser source attaching to the garment. The laser source configured to project the laser on a surface beyond the pet's head end for the entertainment of the pet.

Preferably, the garment comprises a collar worn around the pet's neck. The device preferably comprises a laser director for directing the projection of the laser beam on the surface beyond the pet's head end. It is preferred that the laser directly controls one or both of the horizontal and vertical movements.

It is preferred that horizontal and vertical movement be controlled by the use of servos. The first servo connected to the laser source through use of an extension pole, whereby rotation of first servo causes rotation of the extension pole, which is attached to the laser source, thereby controlling the horizontal movement of the laser. The seconded servo connected to the laser source so that rotation of the second servo causes vertical movement in the projection of the laser beam. In the preferred embodiment, the second servo connects a pulley and cable to the end of the device, thereby creating this vertical movement. It is preferred that these servos be configured for remote operation by user so that a remote user can control the projection of this laser beam and the movement of the pet wearing the garment.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1B:
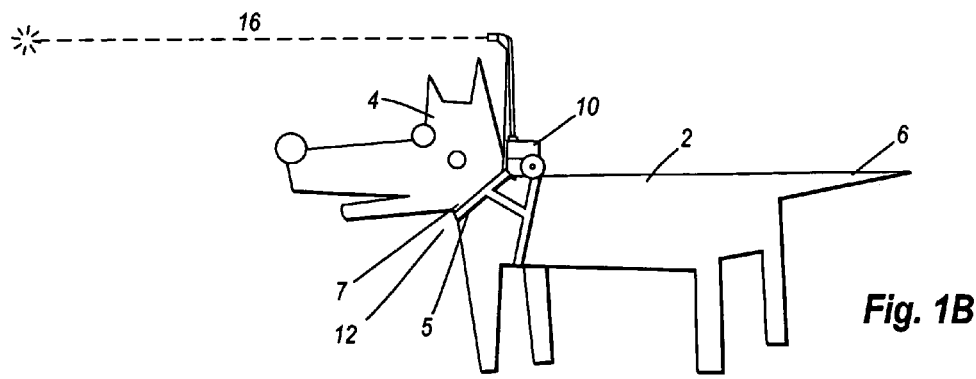
FIG. 1B is a perspective view of a second embodiment of the present invention installed on a pet.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a device for the entertainment of pets and/or the entertainment of owners/third parties present when the present invention is used. The invention, in its simplest form, comprising the attachment of a laser or other light-generating device to an animal through use of a garment. This light-emitting device is for generating a light beam or light pattern upon a surface, preferably in front of the animal. The animal, being inquisitive by nature, will chase or follow said light, thereby entertaining both the animal and the owner/third party.

Figure 1A:
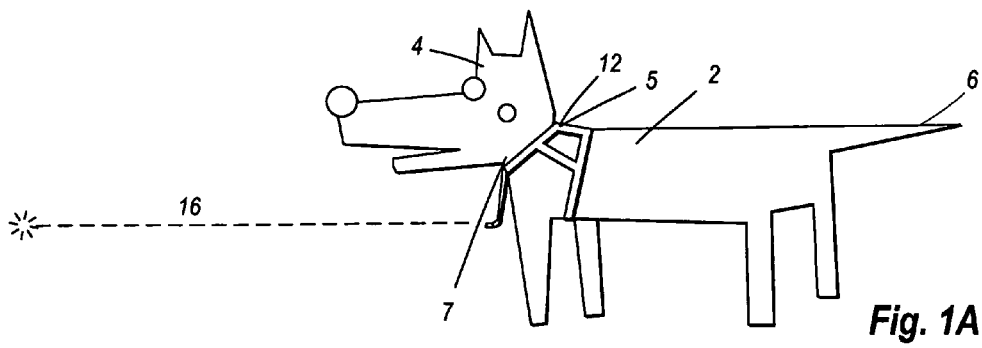
FIG. 1A is a perspective view of a first embodiment of the present invention installed on a pet.

Referring initially to FIGS. 1A and 1B, shown are two embodiments of the present invention. These embodiments used upon a pet 2 having a head end 4 extending to a tail end 6. The pet used in these illustrations is a dog. However, the device can be put on any animal (cats, birds, etc.). Although the word "pet" is utilized, the present invention is also envisioned as being applicable to all animals, in example, working animals such as police dogs, search and rescue dogs, etc. Such animals are especially included in the utilization of the word "pet." Such a pet having a head end 4 extending to a tail end 6 and a neck 7.

The presently invented entertainment device 10 is configured for attachment to a garment 12, such as the collar 5 shown. Such a collar extending around the animal's neck 7 in the standard manner. The pet entertainment device 10 for projecting a laser beam 16 onto a surface 3.

Figure 3:
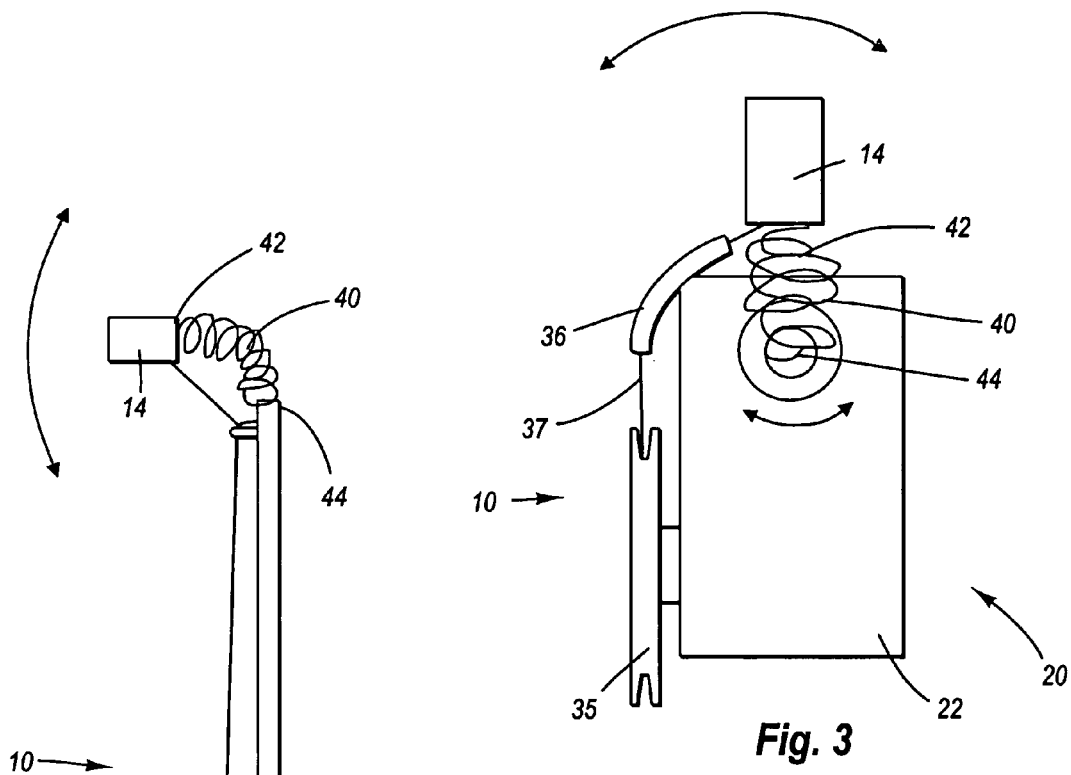
FIG. 3 is a top view of the embodiment of FIG. 2.
Figure 2:
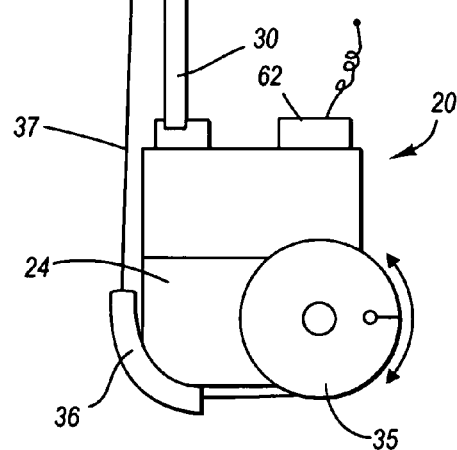
FIG. 2 is the side view of a third embodiment of the present invention.

Referring now to FIGS. 2 and 3, shown is a third embodiment of the present invention. The pet entertainment device 10 comprising a laser source 14. The preferred laser source 14 comprising a diode laser. While the preferred embodiment of the present invention utilizes a laser, it is envisioned that forms or other light emitting devices, including but not limited to, light emitting diodes, incandescent bulbs, florescent bulbs, and high intensity discharge (HID) bulbs, may be utilized to provide the beam of light necessary for the present invention.

This laser source preferably powered through the use of a battery. The laser source for projecting a laser beam 16 or other light source upon a surface. The surface could be the ground in front of the pet, the wall in front of the pet or another surface. While the laser source could be merely aimed directly in front of the pet, it is preferred the laser device be configured for movement so that the laser beam directed therefrom moves relative to the animal.

The present invention achieves this movement through a laser director 20. This laser director comprising any number of means, including but not limited to, mechanical means, chemical means, resilient means, and electronic means. In the embodiment shown, the laser director 20 comprises a pair of servos, namely a first servo 22 and a second servo 24. These servos are perpendicular to one another. Rotation of the first servo preferably causes movement of the laser source 14 within a generally horizontal plane, whereas movement of the second servo preferably results in a generally vertical movement of the laser source and/or laser beam. Therefore, through movement of the first and second servos, the laser beam can be moved as desired along the surface 3.

In the embodiment shown, the invention utilizes an extension pole or post 30 for elevating the laser source 14 away from laser director and the body of the pet entertainment device. While this is not necessary for the operation of the device, such extension or elevation is utilized to position the laser source 14 above the head of the animal, upon which the device is being worn (as shown in FIG. 1A). While it is envisioned the present invention will extend over the head of the animal, it is just as easily modified to extend otherwise away from the body of the animal so as to achieve same purposes while not being vertically over the head of the animal (as shown in FIG. 1B). In the manner shown in the drawings, rotation of the first servo results in rotation of the extension pole. The extension pole is attached via a spring 40 to the laser source, thereby rotation for servo generally results in a generally horizontal rotation of the laser beam projected by the laser source.

In the preferred embodiment, a pulley 35 extends from the second servo 24, which is rotatably attached to the second servo 24. A cable 37 is connected to the pulley 35 and held in tension with the laser source, preferably at the spring first end 42 (spring second in 44 attaching to the extension pole 30), whereas the spring first end 42 attaches to the laser source 14. Being held in tension with the spring portion and/or the laser source itself by releasing said tension, the laser source will move generally vertically. Whereas by increasing such tension, the laser source will be pulled downward thereby directing the laser beam downward. Preferably an elbow 36 or other suitable means is used for directing the movement of the cable 37 relative to the entertainment device 10. While this is discussed as the preferred manner of moving the "aim" of the laser beam, other means and mechanisms for making such movements are likewise envisioned.

It is preferred that a remote control be utilized for controlling the operation of the pet entertainment device 10. As such, a transmitter would be located (handheld) at a first location, whereas a receiver 62 for such transmissions would be built into the pet entertainment device 10 so that the remote control could control the movement and operability (including power-on and power-off) of the pet entertainment device 10. It is preferred that such a remote control system be operated on a wireless radio frequency. However, other manners of doing so are envisioned, including, but not limited to, infrared, ultrasonic, etc. Although the embodiment uses a remote (wireless) control system, it is expressly envisioned that a wired control system could also be formed.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A pet entertainment device for wearing by a pet, said pet having a head end and tail end, a said device comprising:
   a garment configured for wearing by said pet, wherein said garment comprises a collar configured to be worn around said pet's neck;
   a laser source for producing a laser beam, said laser source attaching to said garment, said laser source configured to project said laser beam on a surface beyond said pet's head end, and
   a laser director for directing the projection of said laser beam.

2. The device of claim 1, wherein said laser director controls both the horizontal movement and the vertical movement of said laser beam.

3. The device of claim 2, wherein said horizontal movement is controlled through use of a first servo, and whereas said vertical movement is controlled through use of a second servo.

4. The device of claim 3, wherein said first servo is connected to said laser source, wherefore rotation of said first servo causes a horizontal movement in the projection of said laser beam.

5. The device of claim 3, wherein said second servo is connected to said laser source, wherein rotation of said second servo causes a vertical movement in the projection of said laser beam.

6. The device of claim 1, wherein said device further comprises an extension pole from said garment upon which said laser source is attached, said extension pole for positioning said laser source over said pet's head end so said laser beam can be directed onto a surface in front of said pet.

7. The device of claim 6, wherein said horizontal movement is controlled through use of a first servo which rotates said extension pole.

8. The device of claim 7, further comprising a spring which attaches between said extension pole and said laser source.

9. The device of claim 8, wherein said vertical movement is controlled through use of a second servo that connects via a cable to said spring.

10. The device of claim 1, wherein the operation of said laser director is controlled through use of a remote control.

11. A pet entertainment device for wearing by a pet, said pet having a head end and tail end, a said device comprising:
a garment configured for wearing by said pet;
a laser source for producing a laser beam, said laser source attaching to said garment, said laser source configured to project said laser beam on a surface beyond said pet's head end; and
a laser director for directing the projection of said laser beam, wherein said laser director is configured to move the projection of the laser beam in a pattern relative to said pet.

12. The device of claim 11, wherein said movement pattern is random.

13. The device of claim 11, wherein said movement pattern is predetermined.

14. The device of claim 11, wherein said movement pattern is controlled by a remote control, said remote control controlling said laser director by manipulating both the horizontal movement and the vertical movement of said laser beam.

15. The device of claim 11, wherein said garment comprises a collar configured to be worn around said pet's neck.

16. A pet entertainment device for wearing by a pet, said pet having a head end and tail end, a said device comprising:
a garment configured for wearing by said pet;
a laser source for producing a laser beam, said laser source attaching to said garment, said laser source configured to project said laser beam on a surface beyond said pet's head end;
a laser director for directing the projection of said laser beam, wherein said laser director is configured to move the projection of the laser beam in a pattern relative to said pet; and
a remote controller for controlling the projection and movement of said laser beam, said remote controller controlling said laser director by manipulating both the horizontal movement and the vertical movement of said laser beam.

17. The device of claim 16, wherein said horizontal movement is controlled through use of a first servo, and whereas said vertical movement is controlled through use of a second servo, wherein said first servo is connected to said laser source, wherefore rotation of said first servo causes a horizontal movement in the projection of said laser beam; wherein said second servo is connected to said laser source, wherein rotation of said second servo causes a vertical movement in the projection of said laser beam, and wherein said device further comprises an extension pole from said garment upon which said laser source is attached, said extension pole for positioning said laser source away from said pet's head end so said laser beam can be directed in front of said pet.

18. The device of claim 17, wherein said horizontal movement is controlled through use of a first servo which rotates said extension pole, said device further comprising a spring which attaches between said extension pole and said laser source, and wherein said vertical movement is controlled through use of a second servo that connects via a string to said spring.

* * * * *